(12) United States Patent
Cooley et al.

(10) Patent No.: US 8,881,003 B1
(45) Date of Patent: Nov. 4, 2014

(54) ONLINE STORAGE AGGREGATION AND PUBLISHING

(75) Inventors: Shaun Cooley, El Segundo, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 1929 days.

(21) Appl. No.: 11/956,211

(22) Filed: Dec. 13, 2007

(51) Int. Cl.
*G06F 17/00* (2006.01)
*G06F 17/24* (2006.01)

(52) U.S. Cl.
CPC ..................................... *G06F 17/24* (2013.01)
USPC .......................................................... 715/255

(58) Field of Classification Search
CPC ........................................................ G06F 17/24
USPC .......................................................... 715/255
See application file for complete search history.

(56) References Cited

U.S. PATENT DOCUMENTS

| | | | | |
|---|---|---|---|---|
| 2002/0138619 | A1* | 9/2002 | Ramaley et al. | 709/226 |
| 2002/0143798 | A1* | 10/2002 | Lisiecki et al. | 707/200 |
| 2002/0156702 | A1* | 10/2002 | Kane | 705/27 |
| 2003/0120680 | A1* | 6/2003 | Agrawal et al. | 707/103 R |
| 2003/0149884 | A1* | 8/2003 | Hernandez et al. | 713/193 |
| 2004/0111727 | A1 | 6/2004 | Schwarzbauer et al. | |
| 2005/0102324 | A1* | 5/2005 | Spring et al. | 707/104.1 |
| 2007/0233816 | A1 | 10/2007 | Odenwald | |
| 2007/0245882 | A1 | 10/2007 | Odenwald | |
| 2007/0282874 | A1* | 12/2007 | Metcalfe | 707/101 |
| 2008/0155613 | A1* | 6/2008 | Benya et al. | 725/89 |
| 2009/0249945 | A1 | 10/2009 | Yamashita et al. | |

OTHER PUBLICATIONS

Hetland, "Beginning Python", Python and the Web, copyright 2005, Apress, pp. 313-339.*
U.S. Appl. No. 11/956,227, filed Dec. 13, 2007.

* cited by examiner

*Primary Examiner* — Amelia Tapp
(74) *Attorney, Agent, or Firm* — Brill Law Office; Jeffrey Brill

(57) ABSTRACT

A storage farm is maintained, on which user generated publishable content is stored. Users can copy generated content to the storage farm for automatic publishing to associated target sites. User login information for the plurality of publication sites is maintained, such that the system can use the login information to login to the various publication sites as a given user. The publishable content stored in the storage farm is compared to publishable content published on the associated publication sites. Responsive to finding publishable content on at least one publication site that is not present on the storage farm, that publishable content can be aggregated to the storage farm for future access by the associated user. Responsive to finding publishable content on the storage farm not published on an associated publication site, that publishable content can be automatically published.

21 Claims, 1 Drawing Sheet

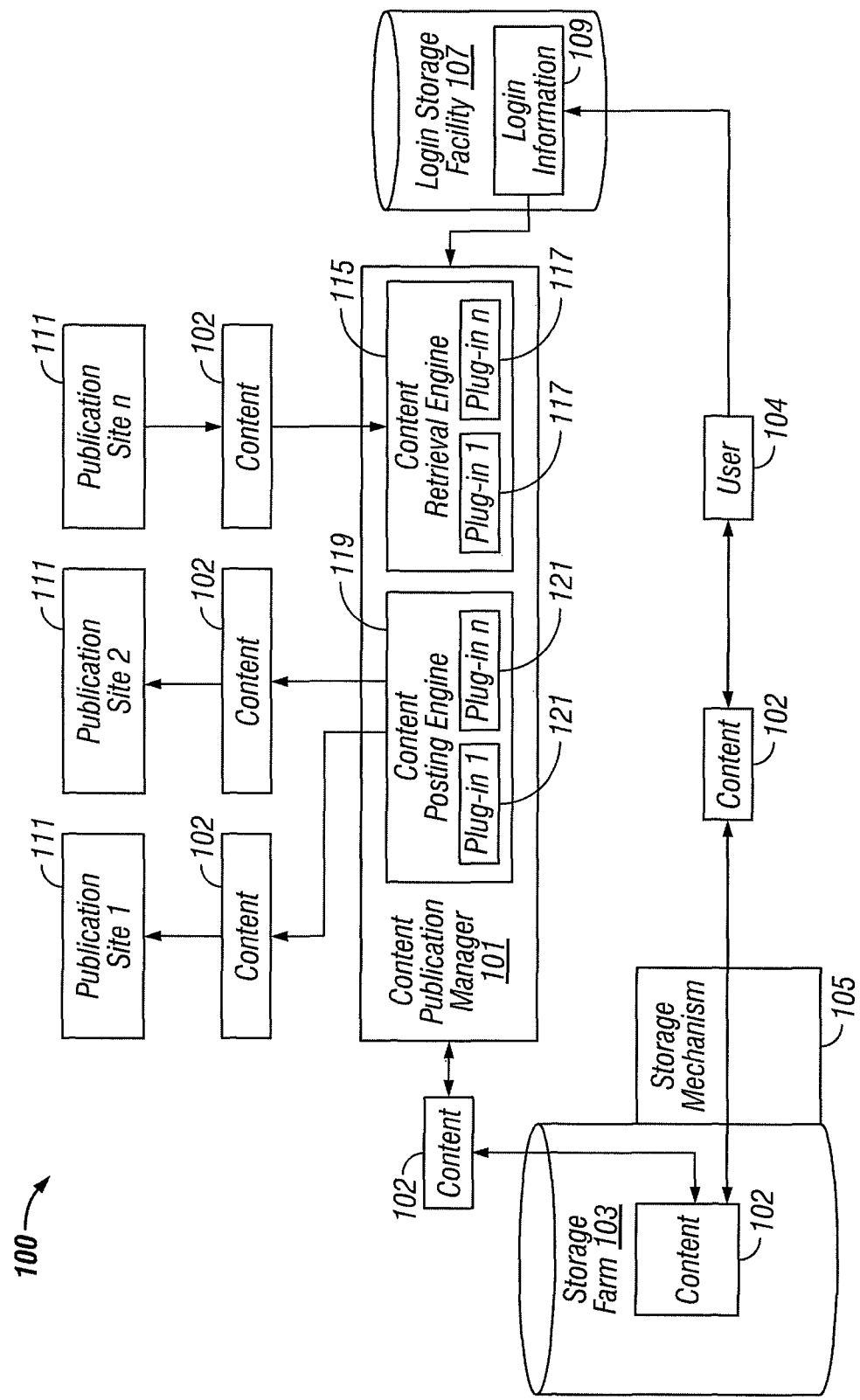

ONLINE STORAGE AGGREGATION AND PUBLISHING

TECHNICAL FIELD

This invention pertains generally to publishing electronic content online, and more specifically to aggregating user generated content to a single storage location, and to posting the content from that location to multiple online targets.

BACKGROUND

Today's internet user is likely to publish content on numerous websites without regard to the longevity, availability, or storage allowances on each site. For example, a content producing internet user is likely to have photographs published on Flickr, MySpace and Facebook and video on YouTube, Google Video, College Humor and similar sites. Most users keep copies of this type of published content on their local computers. However, users are faced with the daunting task of re-collecting all of their published work in the event of a local machine failure.

Simply backing-up this content is burdensome for a user because of the typically large size of multimedia files. Backing up the content to removable media (e.g., CD-ROMs) is not only slow but also expensive, due to the cost of the media. If the user backs-up the content to a remote computer, the slow upload speeds are further exacerbated by the fact that the user has to upload the same content to both the target publishing site and a backup site. It would therefore be desirable if all of a user's publishable content could be automatically aggregated to a single storage site for back-up purposes.

Additionally, in order to publish content on multiple sites, a user must keep repetitively logging-in to different sites, searching their machine for the files to publish and waiting for the content to upload. Thus, it would be further desirable if user content could be published from a single remote site rather than the user's local computer.

SUMMARY

Users can upload publishable content to a single location for automatic publication on one or more associated publication sites. Published content can also be automatically aggregated from a plurality of publication sites to a single location, for future access by an associated user. A storage farm is maintained, on which user generated publishable content is stored. Users can copy generated content to the storage farm for automatic publishing to associated target sites. User login information for the plurality of publication sites is maintained, such that the system can use the login information to login to the various publication sites as a given user. The publishable content stored in the storage farm is compared to publishable content published on the associated publication sites. Responsive to finding publishable content on at least one publication site that is not present on the storage farm, that publishable content can be aggregated to the storage farm for future access by the associated user. Responsive to finding publishable content on the storage farm not published on an associated publication site, that publishable content can be automatically published.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating a system in which a content publication manager can aggregate and publish content, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 in which a content publication manager 101 aggregates and/or publishes content 102, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, all of a user's publishable content 102 can be aggregated and stored externally, for example on a storage farm 103. The implementation mechanics of utilizing a server farm for storage purposes is known to those of ordinary skill in the relevant art, and the usage thereof within the context of the present invention will be readily apparent to one of such a skill level in light of this specification. Typically, a storage farm 103 comprises a plurality of servers and storage media, and utilizes a lot of redundancy.

A storage access mechanism 105 provides users 104 access to content 102 stored on the farm 103. As explained in detail below, the content publication manager 101 can automatically store current versions of all of a user's published content 102 on the storage farm 103. By having all of the current content 102 stored on the farm 103, the user 104 has a convenient centralized location from which to access content 102 the user 104 has published on any content site 111. Thus, users 104 need not worry about recreating all of their published content 102 in the event of a local computer failure.

Users 104 can also upload content 102 to the storage farm 103. By copying content 103 to the storage farm 103 for automatic upload to the appropriate target site 111, content 102 producing internet users 104 need not spend their time uploading content 102 to numerous publication sites 111. As explained in detail below, the content publication manager 101 can automatically deliver the content 102 that users 104 upload to the centralized storage farm 103 to the appropriate target site 111.

As will be readily apparent to those of ordinary skill in the relevant art in light of this specification, the access mechanism 105 can be instantiated in many forms. For example, a website (or other type of software frontend) can provide users 104 with the ability to download, upload, sort, tag, and delete content 102. Another possible example is a software agent that runs on a user's local computer (or a remote computer) which makes the user's view of the storage farm 103 appear as a local drive, or as part of the local file system (e.g., the XDrive agent). The implementation mechanics of these and other access mechanisms 105 are known to those of ordinary skill in the relevant art.

In the XDrive style implementation, a user 104 can access stored content 102 from the farm 103 by opening it from the simulated local drive. Users 104 can also upload content 102 to the farm to be published by copying the content 102 to the simulated local drive. To upload content 102 for publication, a user 104 could create one or more folders and define to which content sites 111 the content in each folder is to be posted. In another embodiment, the user 104 could be prompted, before an upload starts or after it completes, to specify the site(s) 111 on which the content 102 is to be published (and optionally to enter any metadata, such as a title or description).

A login storage, facility 107 is used to store user 104 login information 109 for the various websites 111 on which the user 104 publishes content 102. In some embodiments, this component consists of a software program (e.g., running on a website) that allows users 104 to enter username and password information 109 for the sites 111 from which the user, 104 wants content 102 aggregated. This agent functions as the frontend of a storage mechanism (e.g., a database) in which the user 104 entered login information 109 is stored. It is also possible for this website to allow the user 104 to create filters or other rules defining what content 102 is to aggregated, how often, etc. This can also function as an interface the user 104 can use to specify to which publication sites 111 content 102 from which folder is to be posted, as well as any default metadata.

The content publication manager 101 can include a content retrieval engine 115. This engine 115 accesses the stored login information 109 and logs-in to the various publication sites 111 to check for new user 104 uploaded content 102. New content 102 is retrieved and stored in the user's area of the storage farm 103. The retrieval engine 115 follows any rules defined by the user 104 specifying what content 102 is to aggregated, how often, etc. This engine 115 can also alert the user 104 to any errors that may occur during aggregation.

In some embodiments, the content retrieval engine 115 includes a plurality of content retrieval plug-ins 117. Each plug-in 117 is responsible for handling a specific publication site 111 (or in some cases multiple sites 111). The plug-in 117 for a given site 111 maps site specific functionality (e.g., logging-in, screen scraping, content 102 retrieval, etc.) to methods for the content retrieval engine 115 to call to execute this functionality, thus normalizing engine 115 actions. The functionality provided by these plug-ins 117 can also be built directly into the content retrieval engine 115, although the plug-in 117 model provides a more flexible and extensible framework. The implementation mechanics of instantiating the above-described functionality is known to those of ordinary skill in the relevant art, and its usage within the context of the present invention will be readily apparent to one of such a skill level in light of this specification.

The content publication manager 101 can include a content posting engine 119. The posting engine 119 logs-in to various publication sites 111, uploads any new user 104 content 102 that is found in the user's area of the storage farm 103, and sets any corresponding metadata for any new content. This engine 119 can also alert the user 104 to any errors during posting.

In some embodiments, the content posting engine 119 includes one or more content posting plug-ins 121. As with the content retrieval plug-ins 117, each content posting plug-in 121 maps site specific functionality (e.g., logging-in, screen scraping, content 102 posting/uploading, setting metadata, etc.) to methods for the content posting engine 119 to call to execute this functionality. The functionality provided by these plug-ins 121 can also be built directly into the content posting engine 119. The implementation mechanics of instantiating the above-described functionality is known to those of ordinary skill in the relevant art, and its usage within the context of the present invention will be readily apparent to one of such a skill level in light of this specification.

In another embodiment, a web service (not illustrated) could be defined (e.g., XMLRPC, SOAP, etc.) which would allow content sites 111 to support the above-discussed aggregation and/or content posting model(s). Then a single plug-in, a limited number of plug-ins, or functionality within the content publication manager 101 itself could support all sites 111 that implement this web service.

It is to be understood that the aggregation of user 104 created content 102 published on a plurality of websites 111 to a central storage farm 103 is one function, and the automatic publication of user 104 created content 102 from the central storage farm 103 to a plurality of websites 111 is another. Some embodiments of the invention include the former, some the later and some both.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for managing publishable content, the method comprising the steps of:
    maintaining a storage farm comprising stored publishable content associated with at least one user, the publishable content being associated with a plurality of publication sites, wherein the at least one user can access the storage farm;

maintaining login information for the at least one user for the plurality of publication sites;

utilizing maintained login information to login to at least one of the plurality of publication sites;

automatically comparing publishable content stored in the storage farm to content already published on at least one associated target publication site, by a computer;

responsive to screen scraping to find a first content already published on a first target publication site not present on the storage farm, automatically copying, by a computer, said first content from the first target publication site to the storage farm; and responsive to finding publishable first content on the storage farm not published on a second target publication site, automatically copying, by a computer, said publishable content from the storage farm to the second target publication site.

2. The method of claim 1 further comprising:

determining that at least one user has copied publishable content to the storage farm, said publishable content being associated with at least one publication site; and responsive to the copied publishable content on the storage farm not being published on said at least one associated publication site, publishing said publishable content to said at least one associated publication site.

3. The method of claim 2 further comprising:

receiving information from the at least one user specifying which publishable content is associated with which publication site; and publishing publishable content to at least one publication site according to the received information.

4. The method of claim 2 further comprising:

receiving metadata from the at least one user concerning publishable content; and utilizing the received metadata during the publishing of publishable content to at least one publication site.

5. The method of claim 2 further comprising:

receiving information from at least one user specifying criteria according to which publishable content is to be published; and publishing publishable content associated with the at least one user according to the received criteria.

6. The method of claim 1 further comprising:

responsive to detecting publishable content on at least one publication site not present on the storage farm, aggregating said publishable content to the storage farm such that the copied content is associated with the at least one publication site from which it was aggregated.

7. The method of claim 6 further comprising:

receiving information from at least one user specifying aggregation criteria according to which publishable content is to be aggregated; and aggregating publishable content associated with the at least one user to the storage farm according to the received criteria.

8. The method of claim 1 further comprising:

receiving a request from at least one user to copy publishable content from the storage farm to a user computer; and transmitting the requested publishable content to the user computer.

9. At least one non-transitory computer readable medium storing a computer program product for managing publishable content, the computer program product comprising:

program code for maintaining a storage farm comprising stored publishable content associated with at least one user, the publishable content being associated with a plurality of publication sites, wherein the at least one user can access the storage farm;

program code for maintaining login information for the at least one user for the plurality of publication sites;

program code for utilizing maintained login information to login to at least one of the plurality of publication sites;

program code for automatically comparing publishable content stored in the storage farm to content already published on at least one associated target publication site;

program code for, responsive to screen scraping to find a first content already published on a first target publication site not present on the storage farm, automatically copying, by a computer, said first content from the first target publication site to the storage farm; and program code for, responsive to finding publishable first content on the storage farm not published on a second target publication site, automatically copying, by a computer, said publishable content from the storage farm to the second target publication site.

10. The computer program product of claim 9 further comprising:

program code for determining that at least one user has copied publishable content to the storage farm, said publishable content being associated with at least one publication site; and program code for, responsive to the copied publishable content on the storage farm not being published on said at least one associated publication site, publishing said publishable content to said at least one associated publication site.

11. The computer program product of claim 10 further comprising:

program code for receiving information from the at least one user specifying which publishable content is associated with which publication site; and program code for publishing publishable content to at least one publication site according to the received information.

12. The computer program product of claim 10 further comprising:

program code for receiving metadata from the at least one user concerning publishable content; and program code for utilizing the received metadata during the publishing of publishable content to at least one publication site.

13. The computer program product of claim 10 further comprising:

program code for receiving information from at least one user specifying criteria according to which publishable content is to be published; and program code for publishing publishable content associated with the at least one user according to the received criteria.

14. The computer program product of claim 9 further comprising:

program code for, responsive to detecting publishable content on at least one publication site not present on the storage farm, aggregating said publishable content to the storage farm such that the copied content is associated with the at least one publication site from which it was aggregated.

15. The computer program product of claim 14 further comprising:

program code for receiving information from at least one user specifying aggregation criteria according to which publishable content is to be aggregated; and program code for aggregating publishable content associated with the at least one user to the storage farm according to the received criteria.

16. The computer program product of claim 9 further comprising:

program code for receiving a request from at least one user to copy publishable content from the storage farm to a user computer; and program code for transmitting the requested publishable content to the user computer.

17. A computer system for managing publishable content, the computer system comprising:

a computer memory;

a storage farm comprising stored publishable content associated with at least one user, the publishable content being associated with a plurality of publication sites, wherein the at least one user can access the storage farm;

a login storage facility for maintaining login information for the at least one user for the plurality of publication sites;

a content publication manager residing in the computer memory, the content publication manager being configured for utilizing maintained login information to login to at least one of the plurality of publication sites, and for automatically comparing publishable content stored in the storage farm to content already published on at least one associated target publication site;

a content retrieval engine residing in the computer memory, the content retrieval engine being configured for, responsive to screen scrapping to find a first content already published on the a first target publication site not present on the storage farm, automatically copying said first content from the first target publication site to the storage farm; and a content posting engine residing in the computer memory, the content posting engine being configured for, responsive to finding the first publishable content on the storage farm not published on the second target publication site, automatically copying said publishable content from the storage farm to the second target publication site.

18. The computer system of claim 17 wherein:

the content publication manager is further configured for determining that at least one user has copied publishable content to the storage farm, said publishable content being associated with at least one publication site; and the content posting engine is further configured for, responsive to the copied publishable content on the storage farm not being published on said at least one associated publication site, publishing said publishable content to said at least one associated publication site.

19. The computer system of claim 18 wherein:

the content publication manager is further configured for receiving information from at least one user specifying criteria according to which publishable content is to be published; and the content posting engine is further configured for publishing publishable content associated with the at least one user according to the received criteria.

20. The computer system of claim 17 wherein:

the content retrieval engine is further configured for, responsive to detecting publishable content on at least one publication site not present on the storage farm, aggregating said publishable content to the storage farm such that the copied content is associated with the at least one publication site from which it was aggregated.

21. The computer system of claim 20 wherein:

the content publication manager is further configured for receiving information from at least one user specifying aggregation criteria according to which publishable content is to be aggregated; and means for aggregating publishable content associated with the at least one user to the storage farm according to the received criteria.

\* \* \* \* \*